(No Model.)
J. S. NAUTZ.
FLEXIBLE HARROW.
No. 280,848. Patented July 10, 1883.
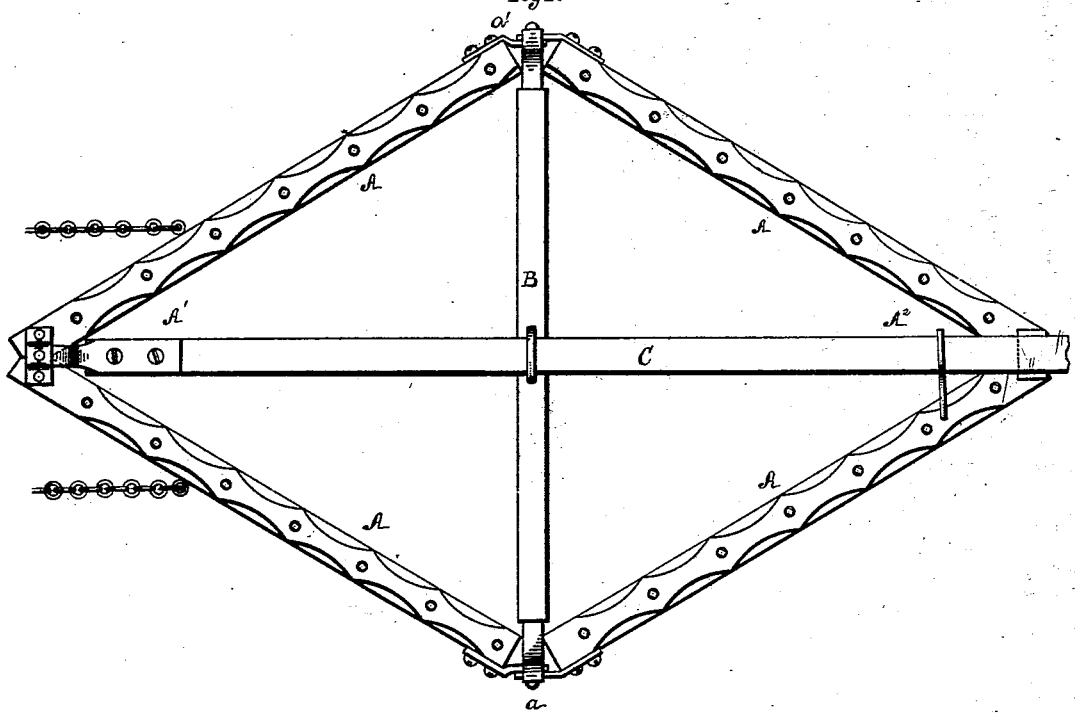
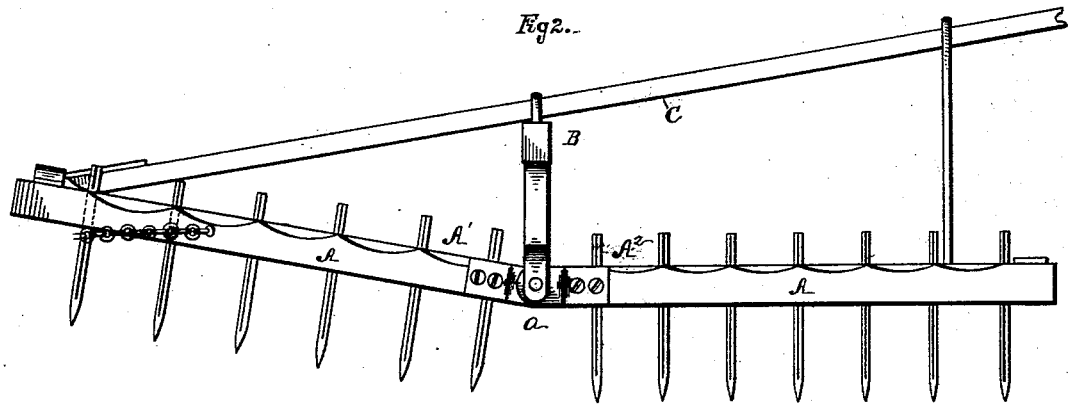
WITNESSES
Samuel E. Thomas
N. S. Wright
INVENTOR
James S. Nautz
By W. W. Legg
Attorney

UNITED STATES PATENT OFFICE.

JAMES S. NAUTZ, OF SHELBYVILLE, ILLINOIS.

FLEXIBLE HARROW.

SPECIFICATION forming part of Letters Patent No. 280,848, dated July 10, 1883.

Application filed April 21, 1883. (No model.)

*To all whom it may concern:*

Be it known that I, JAMES S. NAUTZ, of Shelbyville, county of Shelby, State of Illinois, have invented a new and useful Improvement in Flexible Harrows; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

In the drawings, Figure 1 is a plan view of a device embodying my invention. Fig. 2 is a side elevation.

My invention relates to the improved construction of harrows, more particularly to the class of flexible harrows, and has for its object the construction of said harrows with an elevated adjustable lever-beam and lever attachment thereto, by means of which the harrow may be used with greater facility in stony, stumpy, and cloddy ground.

In carrying out my invention as illustrated in the accompanying drawings, A represents the harrow-frame, preferably constructed in a diamond shape, and consisting of the two wings A' and A², hinged together at any suitable points—as, for instance, at $a$ and $a'$. I would have it understood that I do not limit myself to the form of constructing the harrow-frame or hinging the same together.

B represents the elevated beam, said beam having a pivoted connection at its ends with the adjacent portion of the harrow-frame; or they may be pivoted at the hinged connection of the wings of the frame. The same pivot might be used for pivoting the elevated beam and for securing the two portions of the hinges together, the construction of the elevated beam being such that it may be rocked backward and forward to a suitable extent.

C is the elevated lever, said lever adapted to be secured in an appropriate manner at its front extremity to the forward end of the frame. Said lever may be used upon a harrow of any desired width, and is intended to have a sliding motion upon the elevated beam, and to be secured by any appropriate adjusting device in any desired place thereon, said lever extending rearward sufficient to be operated by the driver. This adjustable mechanism of the elevated beam, it has been found in practice, can be used to advantage in saving time and labor, both for the man and the team, as by means of the lever the front wing of the harrow may be raised so as to clear itself of obstructions, and thereby, also, the harrow may be more conveniently lifted over stones, &c. Thereby, also, the driver is enabled with ease to guide and control the direction of the harrow as may be desired.

What I claim is—

1. The combination of the two front and back wings pivoted or hinged to each other, and the adjustable lever pivoted at one end to the forward end of the front wing, and supported near its middle by the pivoted elevated beam, substantially as described.

2. The combination of the two front and back wings pivoted or hinged to each other, the adjustable lever pivoted at one end to the forward end of the front wing, and the pivoted elevated beam, said lever adapted to slide upon said beam, and the lever and beam adapted to be adjusted relatively to each other, substantially as described.

In testimony whereof I sign this specification in the presence of two witnesses.

JAMES S. NAUTZ.

Witnesses:
M. J. LAUGHLIN,
MARTIN V. MILLER.

Correction in Letters Patent No. 280,848.

Affidavit having been filed showing that the name of the patentee of Letters Patent No. 280,848, granted July 10, 1883, for an improvement in "Flexible Harrows," should have been read and printed *James S. Nantz* instead of "James S. Nautz," it is hereby certified that the said Letters Patent should be read with this correction therein to make the same conform to the record of the case in the Patent Office.

Signed, countersigned, and sealed this 31st day of July, A. D. 1883.

[SEAL.]

M. L. JOSLYN,
*Acting Secretary of the Interior.*

Countersigned:

E. M. MARBLE,
*Commissioner of Patents.*